United States Patent
Tsai et al.

(10) Patent No.: US 8,750,800 B2
(45) Date of Patent: Jun. 10, 2014

(54) BLUETOOTH DEDVICE

(75) Inventors: Cheng-Yu Tsai, Taichung (TW);
Chung-Yi Huang, Taichung (TW);
I-Chang Liu, Taichung (TW);
Chung-Ming Hung, Taichung (TW)

(73) Assignee: Merry Electronics Co., Ltd., Taichung (TW)

( * ) Notice: Subject to any disclaimer, the term of this patent is extended or adjusted under 35 U.S.C. 154(b) by 142 days.

(21) Appl. No.: 13/448,665

(22) Filed: Apr. 17, 2012

(65) Prior Publication Data
US 2013/0273852 A1 Oct. 17, 2013

(51) Int. Cl.
*H04B 7/00* (2006.01)

(52) U.S. Cl.
USPC ............ 455/41.2; 455/575.2; 455/575.1; 379/431

(58) Field of Classification Search
USPC ........ 455/41.2, 575.2, 575.1, 575.6; 379/431, 379/330; 381/374, 379, 384
See application file for complete search history.

(56) References Cited

U.S. PATENT DOCUMENTS

| 4,484,029 | A * | 11/1984 | Kenney | 455/575.2 |
|---|---|---|---|---|
| 6,912,291 | B2 * | 6/2005 | Huang | 381/374 |
| 7,046,799 | B2 * | 5/2006 | Ma | 379/433.13 |
| 8,165,646 | B2 * | 4/2012 | Zheng | 455/575.2 |
| 2003/0068062 | A1 * | 4/2003 | Huang | 381/384 |
| 2005/0058280 | A1 * | 3/2005 | Ma | 379/430 |
| 2010/0151922 | A1 * | 6/2010 | Zheng | 455/575.1 |
| 2012/0114162 | A1 * | 5/2012 | Zheng | 381/384 |

* cited by examiner

*Primary Examiner* — Minh D Dao
(74) *Attorney, Agent, or Firm* — Muncy, Geissler, Olds & Lowe, P.C.

(57) ABSTRACT

A Bluetooth device is provided, which comprises a body used for connecting with an earphone; a rotating member, rotating between a first position and a second position relative to the body, so as to control power on or off of the Bluetooth device.

12 Claims, 12 Drawing Sheets

BLUETOOTH DEDVICE

BACKGROUND OF THE INVENTION

1. Field of Invention

The present invention relates to a Bluetooth device, more particularly to a Bluetooth device capable of turning the power on or off by a rotating member, and being clipped on the clothes when the power is on.

2. Related Art

Figure 1:
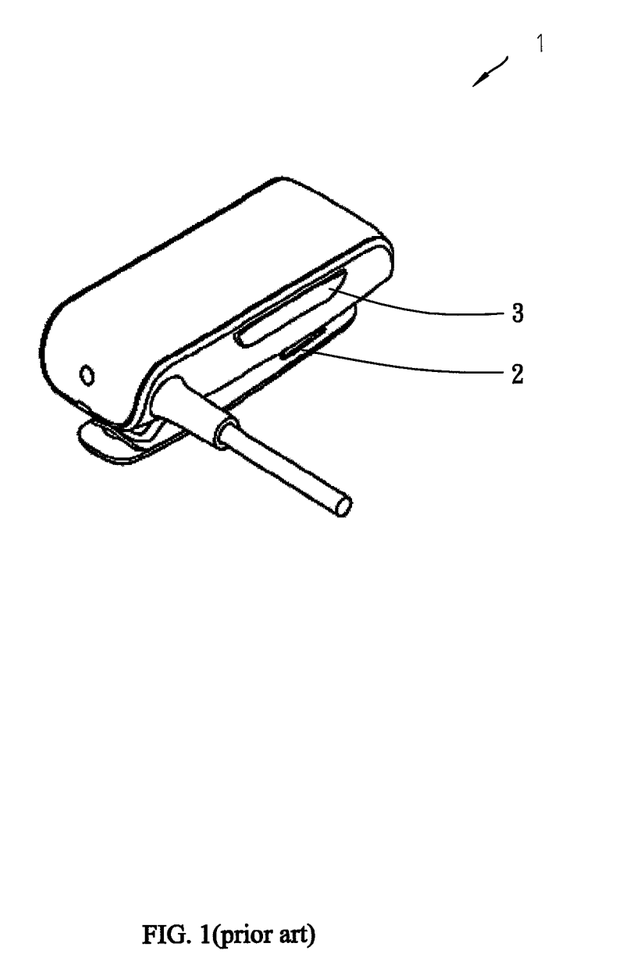
FIG. 1 is an appearance of a conventional Bluetooth device.

Currently, the Bluetooth devices sold in the market are used for wireless transmission between different devices, such as sound transmission between the earphone and the mobile phone. As shown in FIG. 1, a clip 2 is provided on a back side of a Bluetooth device 1 for users to clip the Bluetooth device 1 onto the clothes. On the other hand, due to the clip, the Bluetooth device is unable to effectively reduce its volume. With a trend of compact size for 3C products, an improvement for reducing its volume should be considered. In addition, the power button 3 of the Bluetooth device 1 is exposed to the outer surface thereof, which may cause users to easy touch or push accidentally, so as to bother the user.

SUMMARY OF THE INVENTION

In order to overcome the abovementioned existing problems, the present invention provides a Bluetooth device, especially to a Bluetooth device capable of turning the power on/off by a rotating member, and being clipped onto the clothes when the power is on.

To achieve the above objective, the present invention discloses a Bluetooth device, which comprises a body being configured to connect with an earphone, a rotating member being configured to rotate between a first position and a second position of the body in order to control the power on/off.

Moreover, when in a power-on state, the Bluetooth device can be clipped onto the clothes through a holding space formed by the rotating member and the body.

Furthermore, the present invention provides a rotary switch being connected to an end of the rotating member, and the rotary switch has a first positioning groove and a second positioning groove. The body is disposed with a detent part to selectively engage with one of the positioning grooves to limit the positions of the rotating member.

Furthermore, a guide part is disposed on the rotating member, and the body is disposed with a guide groove which allows the guide part to move inside the groove, so as to limit the rotating angles of the rotating member.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Hereafter, the Bluetooth device according to embodiments of the present invention will be described with the accompanying drawings.

Figure 2:
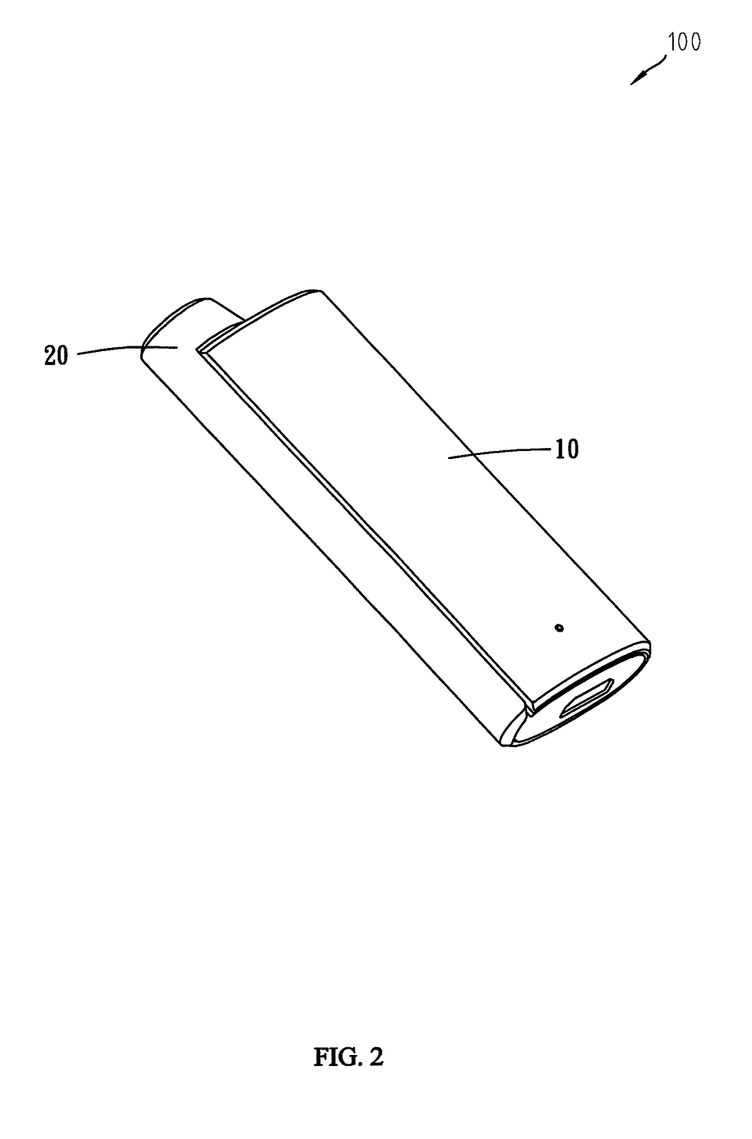
FIG. 2 is a perspective view of a Bluetooth device in a power-off state according to an embodiment of the present invention.

Referring the FIG. 2, it is a perspective view of a Bluetooth device according to a first embodiment of the present invention. The Bluetooth device 100 comprises a body 10 and a rotating member 20. The Bluetooth device 100 can turn the power on/off by rotating the rotating member 20 relative to the body 10, and the rotating member 20 can rotate between a first position and a second position, so as to control the power on/off of the Bluetooth device 100. The Bluetooth device 100 may corporate with an earphone to perform the functions of calling and receiving calls.

Figure 3:
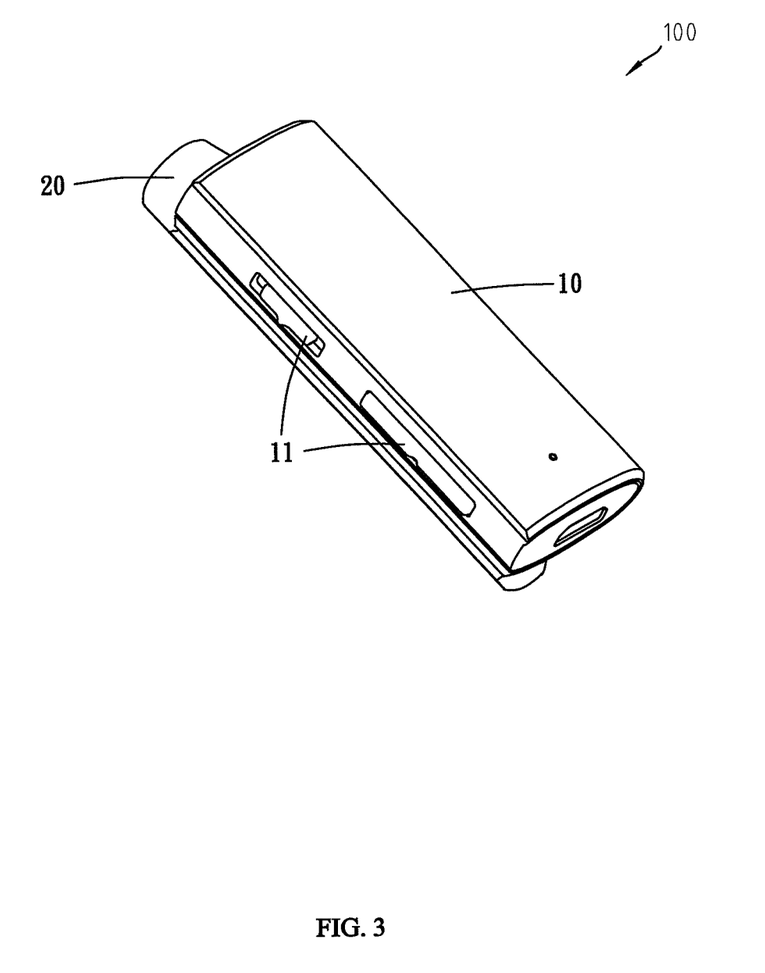
FIG. 3 is a perspective view of a Bluetooth device in a power-on state according to a first embodiment of the present invention.

Referring to FIG. 3, it is a perspective view of a Bluetooth device in a power-on state according to the first embodiment of the present invention. When the rotating member 20 of the Bluetooth device 100 is rotated to a back side of the body 10, the Bluetooth device 100 is in a power-on state. In addition, the user may use an adjustment key set 11 disposed on a lateral side of the body 10 to control the Bluetooth device 100, and the adjustment key set 11 may include the volume control, selection control, or other functions.

Figure 4:
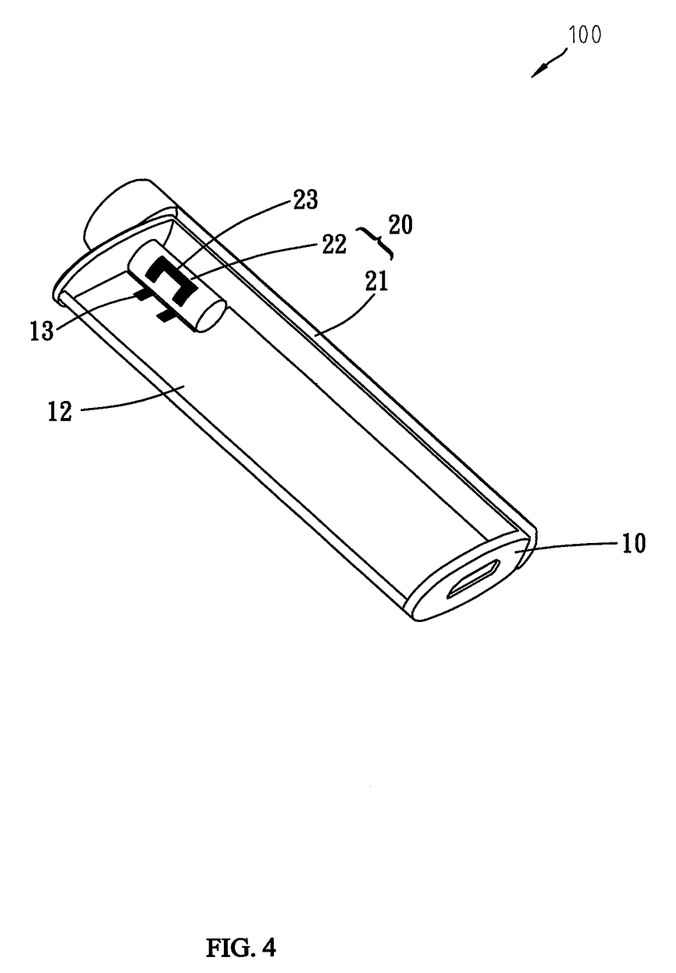
FIG. 4 is a perspective view of components inside the Bluetooth device in a power-off state according to the first embodiment of the present invention.

Referring to FIG. 4, it is a perspective view of components inside the Bluetooth device in a power-off state according to the first embodiment of the present invention. In this drawing, the components inside the body 10 are shown. The rotating member 20 comprises a grip portion 21 and a shaft portion 22. The shaft portion 22 is pivotly disposed on one end of the body 10, and the grip portion 21 is moving along the outer periphery of the body 10 in accordance with the rotation of the shaft portion 22, such that the rotating member 20 may rotate between a lateral side and a back side of the body 10.

In addition, the shaft portion 22 of the rotating member 20 is disposed with a first power electrode 23, and the body 10 is disposed with a circuit board 12. In the circuit board 12, a second power electrode 13 is disposed on a position corresponding to that of the first power electrode 23. When in the first position, the first power electrode 23 is not contact with the second power electrode 13; the circuit becomes an open-circuit state, and the Bluetooth device 100 is in a power-off state.

Figure 5:
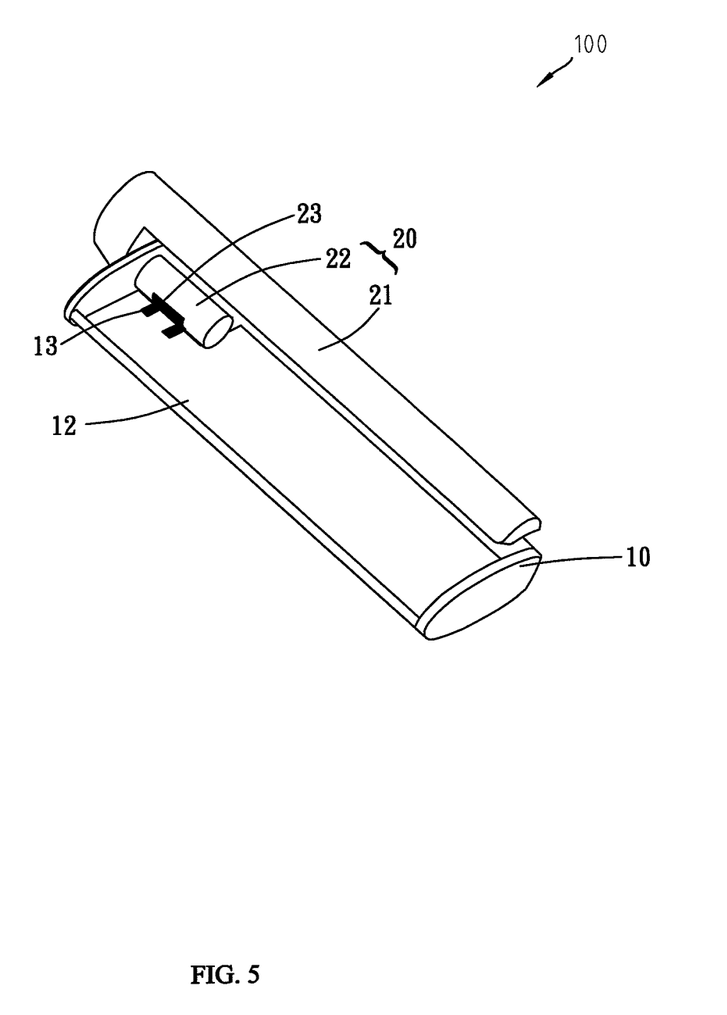
FIG. 5 is a perspective view of components inside the Bluetooth device in a power-on state according to the first embodiment of the present invention.

Referring to FIG. 5, it is a perspective view of components inside the Bluetooth device in a power-on state according to the first embodiment of the present invention. When the rotating member 20 is rotating from the lateral side to the back side of the body 10, the first electrode 23 is contact with the second electrode 13 on the circuit board 12; the circuit becomes a short-circuit state, and the Bluetooth device 100 is in a power-on state such that the user may perform the functions of the Bluetooth device 100.

Figure 6:
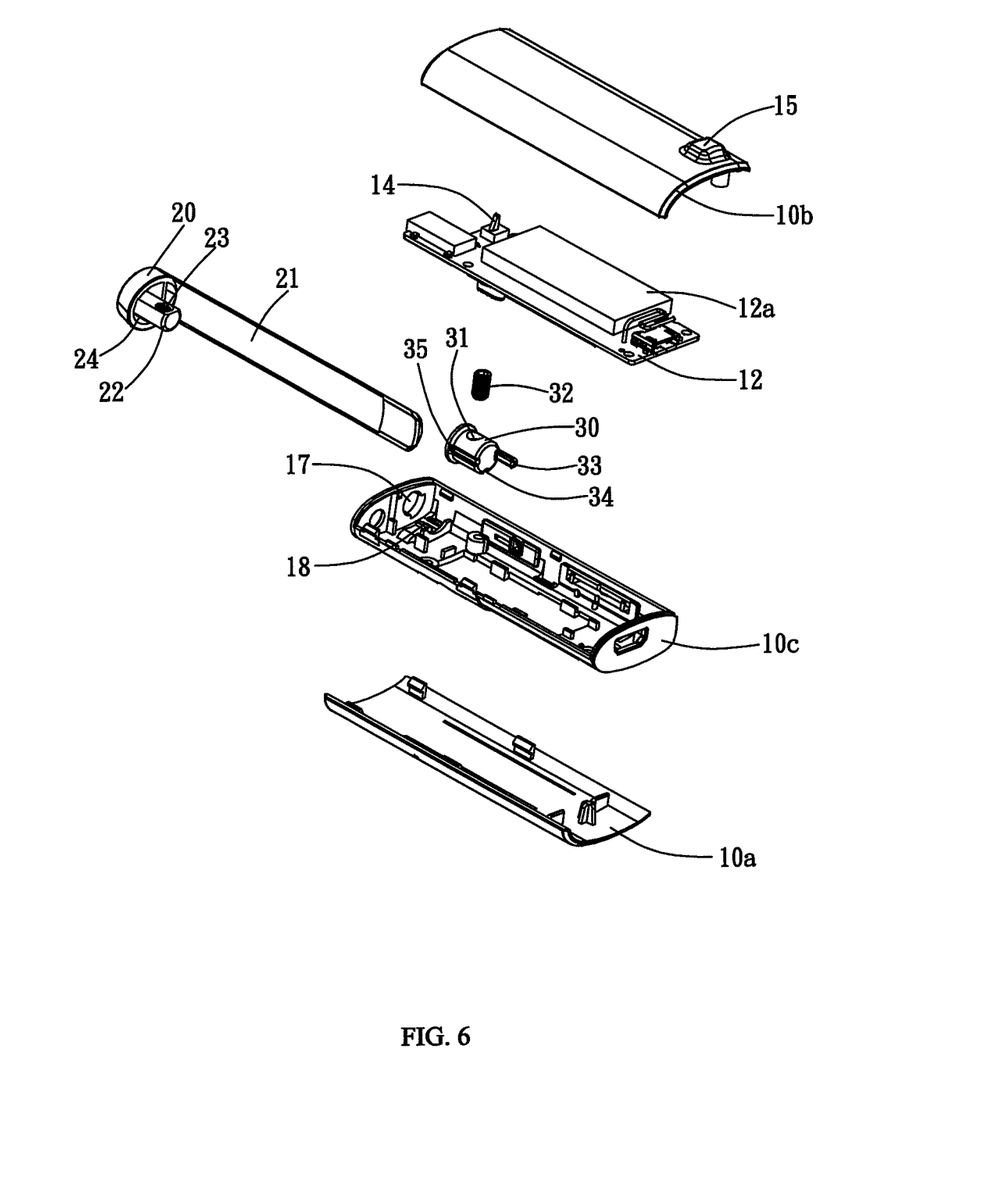
FIG. 6 is an exploded view of the Bluetooth device according to a second embodiment of the present invention.

Referring to FIG. 6, it is an exploded view of the Bluetooth device according to a second embodiment of the present invention. The difference between the first embodiment and the second embodiment lies in that: the body 10 is composed by a front case 10a, a rear case 10b and a case body 10c. The circuit board 12 is disposed in the case body 10c, and the circuit board 12 is disposed with a battery 12a and a power switch 14. One end of the case body 10c is disposed with a shaft hole 17, and a detent part 18 with elastic flexibility is disposed on a lateral side of the shaft hole 17. The rotating member 20 further comprises a screw hole 23 and an axially extending guide part 24 located on a bottom side of the shaft portion 22. The rotating member 20 is rotating relative to the case body 10c by inserting and fixing the shaft portion 22 into the shaft hole 17. In addition, an outer surface of the rear case 10b is disposed with a protrusion 15.

A rotary switch 30 has a through hole 31, and the through hole 31 is provided for fixing the rotary switch 30 into the screw hole 23 of the rotating member 20 through a screw 32. One end of the rotary switch 30 is protruded with an eccentric part 33, and the outer periphery of the rotary switch 30 is disposed with a first positioning groove 34 and a second positioning groove 35. The first positioning groove 34 and the second positioning groove 35 are disposed substantially at 90 degrees with respect to one another.

Figure 7:
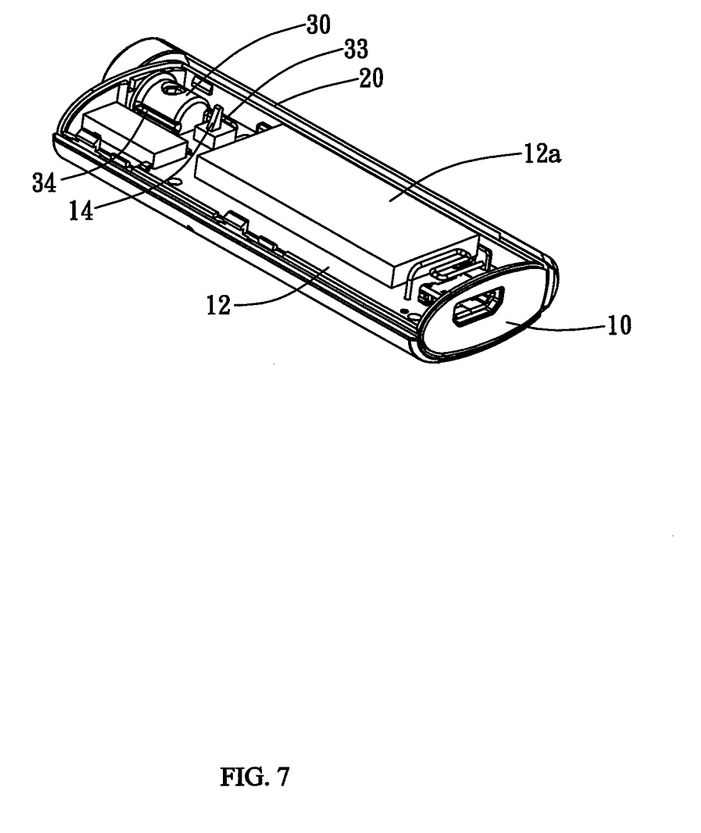
FIG. 7 is a perspective view of the Bluetooth device in a power-off state according to the second embodiment of the present invention.

Referring to FIG. 7, it is a perspective view of the Bluetooth device in a power-off state according to the second embodiment of the present invention. When in the first position, the eccentric part 33 and the power switch 14 are not interfered with each other, such that the Bluetooth device 100 is in a power-off state.

Figure 8:
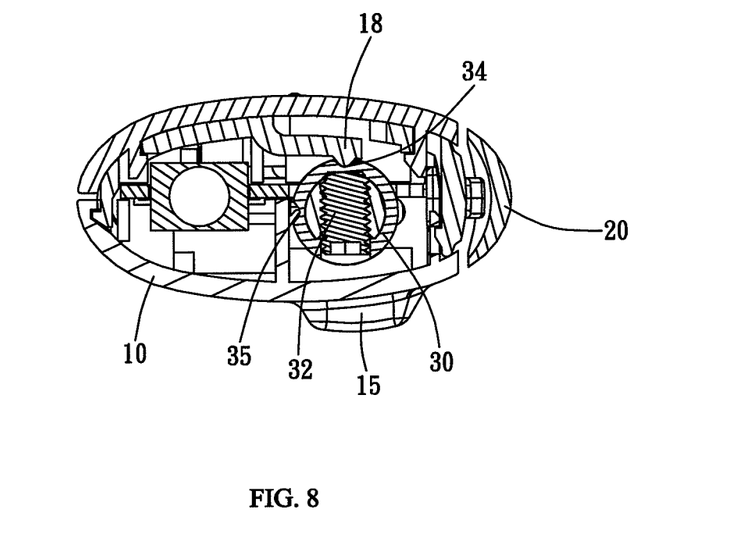
FIG. 8 is a cross-section view of the Bluetooth device in a power-off state according to the second embodiment of the present invention.

Referring to FIG. 8, it is a cross-section view of the Bluetooth device in a power-off state according to the second embodiment of the present invention. When in the first position, the rotating member 20 is staying in a side position of the body; therefore, the position of the first positioning groove 34 of the rotary switch 30 is constrained by the detent part 18.

Figure 9:
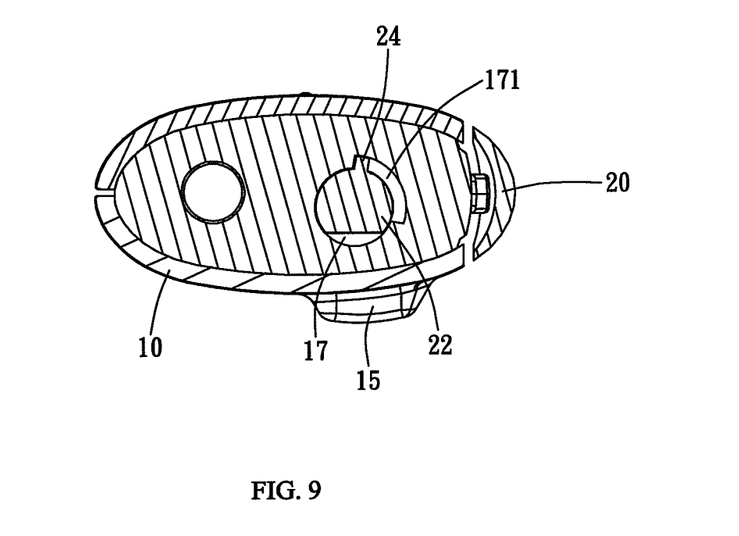
FIG. 9 is another cross-section view of the Bluetooth device in a power-off state according to the second embodiment of the present invention.

Referring to FIG. 9, it is another cross-section view of the Bluetooth device in a power-off state according to the second embodiment of the present invention. When in the first position, the shaft portion 22 of the rotating member 20 is inserting into the shaft hole 17, and the guide part 24 of the rotating member 20 is just located on one end of the guide groove 171 communicated with the shaft hole 17.

Figure 10:
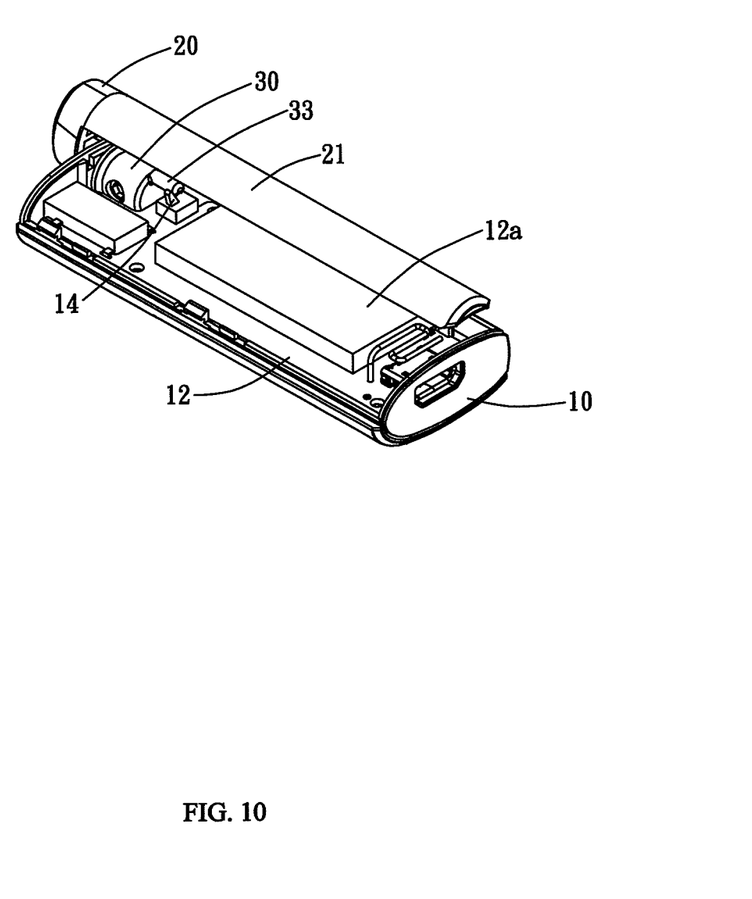
FIG. 10 is a perspective view of the Bluetooth device in a power-on state according to the second embodiment of the present invention.

Referring to FIG. 10, it is a perspective view of the Bluetooth device in a power-on state according to the second embodiment of the present invention. When the rotating member 20 is rotating from the lateral side to the back side of the body, the eccentric part 33 of the rotary switch 30 applies a bias voltage to the power switch 14, so as to trigger the power switch 14; therefore, the Bluetooth device 100 is in a power-on state for users to perform the functions of the Bluetooth device 100.

Figure 11:
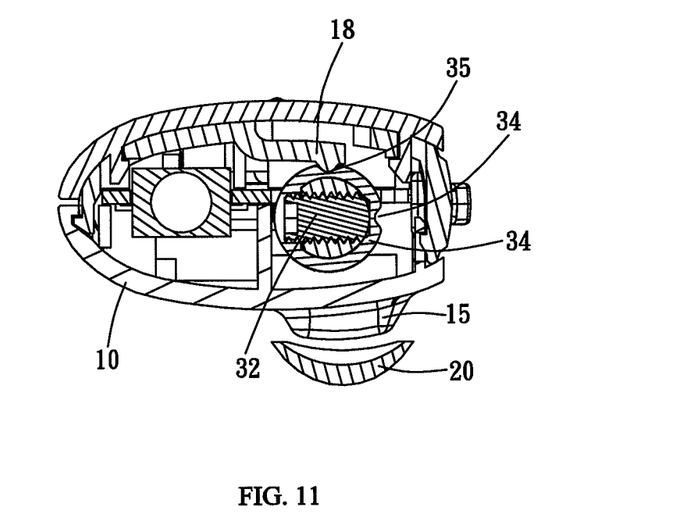
FIG. 11 is a cross-section view of the Bluetooth device in a power-on state according to the second embodiment of the present invention.

Referring to FIG. 11, it is a cross-section view of the Bluetooth device in a power-on state according to the second embodiment of the present invention. When the rotating member 20 is rotated to the second position, the rotary switch 30 is rotated in accordance with the rotation of the rotating member 20. Therefore, the first positioning groove 34 is far away from the detent part 18, and the position of the second positioning groove 35 is constrained by the detent part 18. When the rotating member 20 is rotating between the first position and the second position, an effective positioning effect can be obtained through the combination of the first position groove 34, the second position groove 35, and the detent part 18, which benefits user operations.

Figure 12:
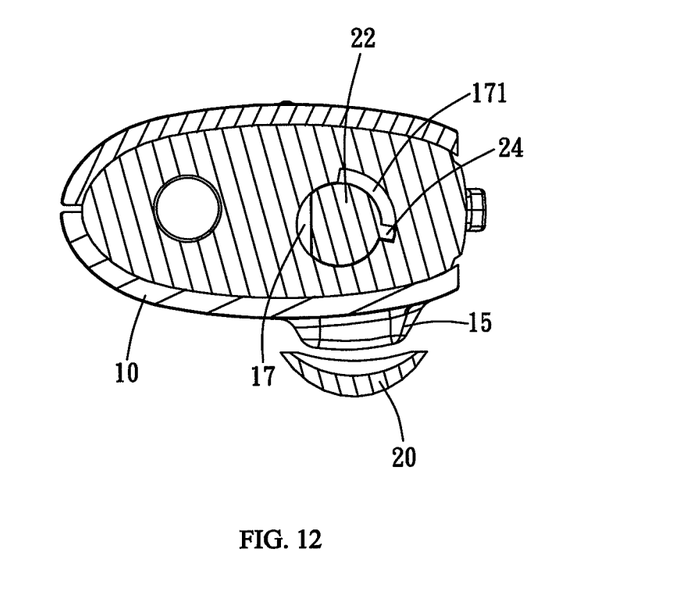
FIG. 12 is another cross-section view of the Bluetooth device in a power-on state according to the second embodiment of the present invention.

Referring to FIG. 12, it is another cross-section view of the Bluetooth device in a power-on state according to the second embodiment of the present invention. When in the second position, the guide part 24 of the rotating member 20 is shifted from one end of the guide groove 171 and stopped at the other end of the guide groove 171. In addition, by disposing the guide part 24 and the guide groove 171, the rotating angles of the rotating member 20 can be limited within a range of predetermined angels.

Figure 13:
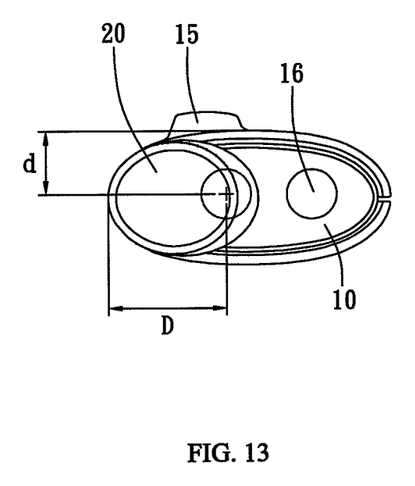
FIG. 13 is a top view of the Bluetooth device in a power-off state according to the present invention.

Referring to FIG. 13, it is a top view of the Bluetooth device in a power-off state according to the present invention. In the drawing, it shows that an earphone socket 16 is provided in the body 10 for connecting with an earphone jack of an earphone. In addition, the distance D from the axle center of the shaft portion 22 of the rotating member 20 to the lateral side of the body 20 is lager than the distance d from the axle center of the shaft portion 22 to the back side of the body 20, such that the rotating member 20 is closer to the lateral side of the body 10 when in the first position.

Figure 14:
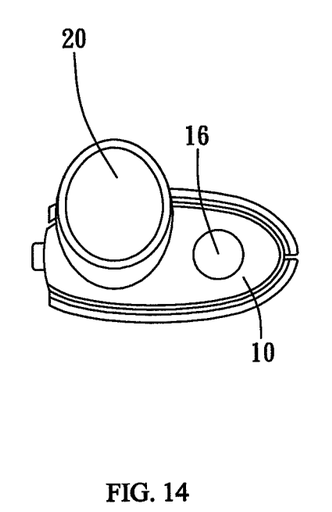
FIG. 14 is a top view of the Bluetooth device in a power-on state according to the present invention.

Referring to FIG. 14, it is a top view of the Bluetooth device in a power-on state according to the present invention. Owning to the fact that the distances from the shaft portion 22 to the lateral side and back side of the body 10 are different, when the rotating member 20 is rotating from the first position to the second position, the rotating member 20 is far away from the back side of the body 10; therefore, a holding space can be formed between the rotating member 20 and the body 10. The holding space may cooperate with the protrusion 15, such that the Bluetooth device 100 can be clipped onto the user's clothes when the Bluetooth device 100 is adjusted to the second position.

Figure 15:
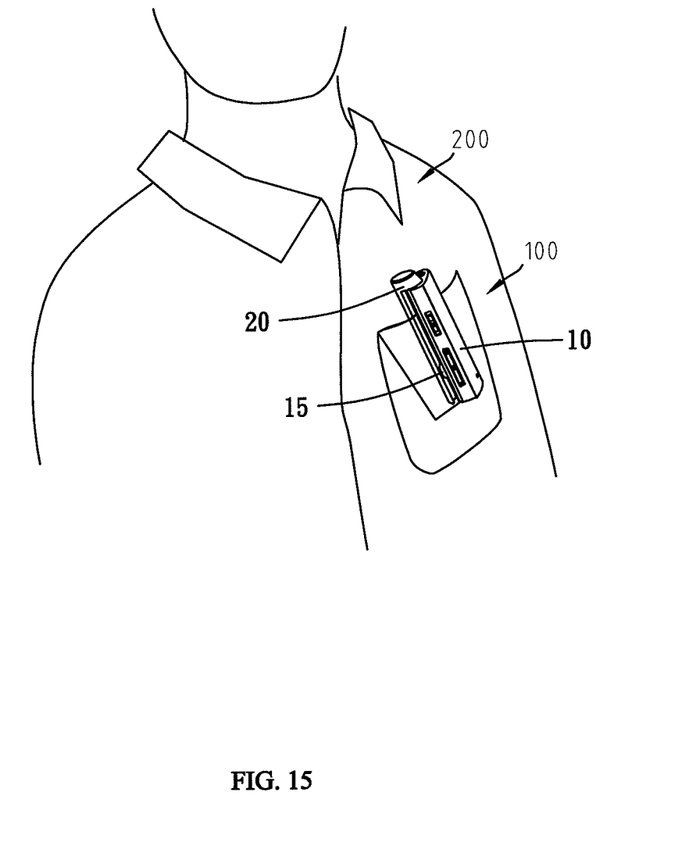
FIG. 15 is a perspective view of a Bluetooth device clipping onto the clothes according to the present invention.

Referring to FIG. 15, it is a perspective view of a Bluetooth device clipping onto the clothes according to the present invention. When the Bluetooth device 100 is in a power-on state, the Bluetooth device 100 can be clipped onto the user's clothes through the holding space formed by the rotating member 20 and the body 10. In addition, by disposing the protrusion 15 between the body 10 and the rotating member 20, a holding effect of the Bluetooth device can be enhanced.

In the Bluetooth device of the present invention, a rotating member rotating relative to the body is taken for the power control. The rotating member can be shifted between the lateral side and the back side of the body to trigger the power on/off of the Bluetooth device. In such a way that provides the convenience for users in operations. Also, when the Bluetooth device is in a power-on state, the rotating member and the body forms a holding space, such that the Bluetooth device can be clipped onto the user's clothes. Compared to the conventional structure, the Bluetooth device of the present invention can reduce the possibility of accidental touching power and have a slimmer appearance.

In addition, in the present invention, the guide part of the rotating member is cooperating with the guide groove of the case body, so as to limit the rotating angles of the rotating member in the guide groove. Moreover, by disposing the first positioning groove, the second positioning groove and the detent part, the rotary switch can remain a fixed position when the rotating member is in the first position and the second position, which provides benefits for user operations.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A Bluetooth device, comprising:
   a body, connecting with an earphone;
   a rotating member, rotating between a first position and a second position relative to the body, so as to control power on or off of the Bluetooth device,
      wherein the rotating member comprises a grip portion and a shaft portion, the shaft portion is pivotly disposed on one end of the body, and the grip portion is moving along outer periphery of the body in accordance with rotation of the shaft portion.

2. The Bluetooth device as claimed in claim 1, wherein the shaft portion has a first power electrode, the body is disposed with a second power electrode, when the rotating member is rotated to the first position relative to the body, the first power electrode and the second power electrode are in an open-circuit state, when the rotating member is rotated to the second position relative to the body, the first power electrode and the second power electrode are in a short-circuit state.

3. The Bluetooth device as claimed in claim 2, wherein the second power electrode is disposed on a circuit board of the body.

4. The Bluetooth device as claimed in claim 1, wherein the body is disposed with a circuit board, the circuit board has a power switch, when the rotating member is in the first position relative to the body, the power switch is in a power-off state, when the rotating member is in the second position, the power switch is pressed by the shaft part to be electrical conducting.

5. The Bluetooth device as claimed in claim 4, wherein a rotary switch is connected to an end of the shaft portion, and the rotary switch has an eccentric part, the eccentric part is used for pressing the power switch when the rotating member is in the second position.

6. The Bluetooth device as claimed in claim 5, wherein the body has a detent part with elastic flexibility, outer periphery of the rotary switch has a first positioning groove and a second positioning groove to selectively engage with the detent part.

7. The Bluetooth device as claimed in claim 6, wherein the first positioning groove and the second positioning groove are disposed at 90 degrees with respect to one another.

8. The Bluetooth device as claimed in claim 5, wherein the body has a shaft hole provided for the shaft part of the rotating member to pass through, and a side of the shaft part has a guide part, the shaft hole is communicated with a guide groove and the guide groove is provided for locating the guide part, so as to limit rotating angles of the rotating member.

9. The Bluetooth device as claimed in claim 1, wherein a distance from an axle center of the rotating member to a lateral side of the body is larger than a distance from the axle center of the rotating member to a back side of the body.

10. The Bluetooth device as claimed in claim 1, wherein a lateral side of the body is disposed with an adjustment key set, when the rotating member is in the first position, the adjustment key set is coved by the grip portion.

11. A Bluetooth device, comprising:
    a body, connecting with an earphone;
    a rotating member, rotating between a first position and a second position relative to the body, so as to control power on or off of the Bluetooth device,
    wherein a back surface of the body is disposed with a protrusion.

12. A Bluetooth device, comprising:
    a body, connecting with an earphone;
    a rotating member, rotating between a first position and a second position relative to the body, so as to control power on or off of the Bluetooth device,
    wherein a holding space is formed by the rotating member and the body when the rotating member is rotated to the second position so as to turn on the power.

\* \* \* \* \*